COMPOSITIONS,
COATING OR PLASTIC.

Patented Apr. 25, 1933

1,906,138

UNITED STATES PATENT OFFICE

JOHN H. DELANEY, OF LOS ANGELES, CALIFORNIA; UNION BANK & TRUST CO. OF LOS ANGELES, ADMINISTRATOR OF SAID JOHN H. DELANEY, DECEASED, ASSIGNOR TO ESTATE OF ADA W. DELANEY, DECEASED

ACOUSTIC MATERIAL

No Drawing. Application filed April 9, 1928. Serial No. 268,805.

This invention relates to acoustics, and particularly to means whereby the acoustic properties of an interior, such as a church, theatre, or the like, can be improved.

It is well-known that, if no precautions be taken, and when ordinary interior finishes are applied to the walls, such finishes serve as reflectors for sound. The result is that audition is materially interfered with. In order to correct this, it has been proposed to provide a finish that absorbs a large portion of the incident sound energy, thereby preventing reflection to a large extent. Such a finish can be provided for example, by applying porous or bubbly plaster, especially one in which porous material, such as pumice particles is incorporated.

Such finishes, while capable of use, also have inherent disadvantages. They cannot readily be applied directly by an ordinary hawk and trowel, or else if once applied, they do not cling to the wall surfaces for an indefinite period, but tend to drop off.

It is one of the objects of my invention to make it possible to apply such acoustic finishes with an ordinary hawk and trowel, while obviating these disadvantages; and especially by careful choice of the proportioning of the constituents.

In one form of my invention, I utilize a binder with a gypsum base, such as plaster of Paris or an equivalent binder, which is homogeneously mixed with effervescing or gas evolving material to produce pits, channels, or grooves, and in which is also included aggregate material, such as sand, or porous material in the form of granules, such as pumice. Due to the spongy character of the binder after it is applied, it can readily absorb and retain moisture, which deteriorates the materials, and renders the entire finish weak. It is another object of my invention to make it possible to secure the porous effect, and yet ensure against too great an absorption of moisture.

My invention possesses further advantages and has other objects which will be made apparent from the following description of one form of the invention. Although but one form is specifically described, it is of course evident that my invention may be embodied in other forms; and the scope of my invention may best be determined by the aid of the claims appended hereto.

In practicing my invention, I utilize three fundamental homogeneously commingled ingredients; a binder such as plaster of Paris, in the dry form; effervescing material; and lumps or grains of aggregate, such as sand, or porous material, such as pumice.

I find that by careful proportioning of the aggregate, the effervescing material, and the binder, I obtain a material that can easily be applied and is strong when applied. The best proportioning, I find, is obtained by mixing two cubic feet of plaster of Paris or other binder in solid, powdered form to three cubic feet of the aggregate material; and to this mixture I add equal amounts of aluminum sulfate and calcium carbonate; these materials produce effervescence and the preferred amount is four and three quarter pounds of each of these salts added to the mixture of aggregate and the binder. The proportion of aggregate and binder can be varied slightly; for example, it is possible to utilize one cubic foot of the binder to four of the porous material; this is the lower limit for the binder; the upper limit is reached when three cubic feet of binder is mixed with two of aggregate.

The addition of the effervescing material is of great benefit. In the first place, when water is added to the mixture as specified, the bubbling serves to agitate the aggregate particles and the binder, and thereby to produce a homogeneous spongy texture. In addition to this advantage, I find that the resultant spongy material is much more cohesive than if no effervescing material were present, and the mixture exhibits more strength. It is for this reason that I can use as poor a mixture of binder and aggregate as one to four without materially weakening the finish.

The combination of aluminum sulphate and calcium carbonate as the effervescing material is also advantageous because it has the property of absorbing moisture; that is, it is hygroscopic. When the binder is mixed with this combination, it can stay fresh a long time, because moisture accumulating in the mixture will cause no hardening, but will instead be absorbed by the hygroscopic material.

When the wet mixture is placed on the walls as described, the pits and channels formed by the effervescing material are left in the finish, and it therefore has a high sound absorbing effect. The addition of porous material, such as pumice instead of sand or other aggregate, renders the finish still more efficient for sound absorption. Furthermore, the finish after it is applied, resists moisture because of the residual hygroscopic material retained therein.

Of course it is possible to utilize other form of binder instead of plaster of Paris; for example, the various forms of cements could be used, as well as other cements using a gypsum base. Also, other forms of porous matter instead of pumice could be substituted; for example, coke. However, pumice is preferred because its color even if exposed in the finish is unobjectionable. It can be utilized in small sizes; for example, ranging from such that will pass a sixteenth inch mesh, to such that will pass a half inch mesh.

I claim:

1. Material adapted to be used for the finish of wall surfaces, comprising not more than three parts by volume of a binder free from water, to two parts by volume of aggregate; and not less than one part by volume of the binder to four parts by volume of the aggregate; and effervescing matter sufficient to impart a spongy texture to the material when wetted.

2. Material adapted to be used for the finish of wall surfaces, comprising not more than three parts by volume of calcined gypsum, to two parts by volume of aggregate; and not less than one part by volume of the gypsum to four parts by volume of the aggregate; and effervescing matter sufficient to impart a spongy texture to the material when wetted.

3. The material as specified in claim 1, in which the effervescing matter includes equal parts of aluminum sulphate and calcium carbonate, in the proportion of about 4¾ pounds of each to five cubic feet of the binder and aggregate.

In testimony whereof I have hereunto set my hand.

JOHN H. DELANEY.